United States Patent [19]
Koujiya et al.

[11] Patent Number: 5,762,372
[45] Date of Patent: Jun. 9, 1998

[54] SEAT BELT TENSIONER

[75] Inventors: Mutsumasa Koujiya, Toyota; Kazuyoshi Isaji, Kariya; Shinichi Iwai, Gifu; Yutaka Ohasi, Handa; Toshihiro Takei, Okazaki, all of Japan

[73] Assignee: Nippondenso Co., Ltd., Japan

[21] Appl. No.: 455,915

[22] Filed: May 31, 1995

[30] Foreign Application Priority Data

May 31, 1994 [JP] Japan .................................. 6-118959
May 31, 1994 [JP] Japan .................................. 6-142299

[51] Int. Cl.⁶ ............................................ B60R 22/46
[52] U.S. Cl. .................... 280/806; 280/801.1; 297/480
[58] Field of Search .......................... 280/801.1, 806; 297/480, 468

[56] References Cited

U.S. PATENT DOCUMENTS

| 4,913,497 | 4/1990 | Knabel et al. |
| 5,129,679 | 7/1992 | Specht et al. |
| 5,290,062 | 3/1994 | Fohl |
| 5,374,110 | 12/1994 | Hiramatsu |

FOREIGN PATENT DOCUMENTS

| 306299 | 3/1989 | European Pat. Off. |
| 499665 | 8/1992 | European Pat. Off. |
| 599810 | 6/1994 | European Pat. Off. |
| 5-42013 | 6/1993 | Japan . |
| 3925570 | 4/1991 | United Kingdom . |
| 41 19 233 | 12/1992 | United Kingdom . |

*Primary Examiner*—Eric D. Culbreth
*Attorney, Agent, or Firm*—Cushman Darby & Cushman Intellectual Property Group of Pillsbury Madison & Sutro, LLP

[57] ABSTRACT

A seat belt tensioner includes a wire, a spring retainer connected to a seat belt buckle by the wire, a casing within which the spring retainer is linearly movable, a primary coil spring contacting the spring retainer, a leaf spring for limiting movement of the spring retainer, a secondary coil spring, and a mass body supported relative to the spring retainer through the secondary coil spring in the direction in which an inertial force is applied. The mass body is moved against the action of the secondary coil spring when a predetermined deceleration is applied, the mass body slides and the primary coil spring is released.

14 Claims, 10 Drawing Sheets

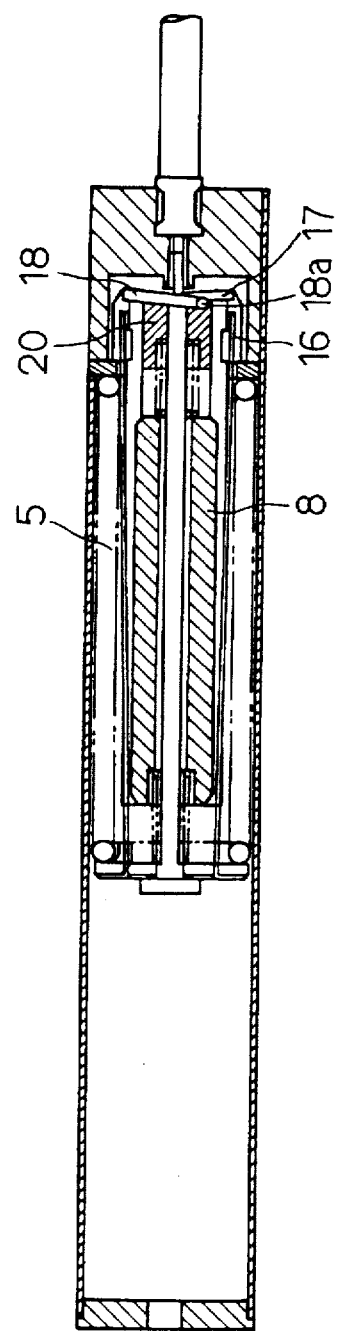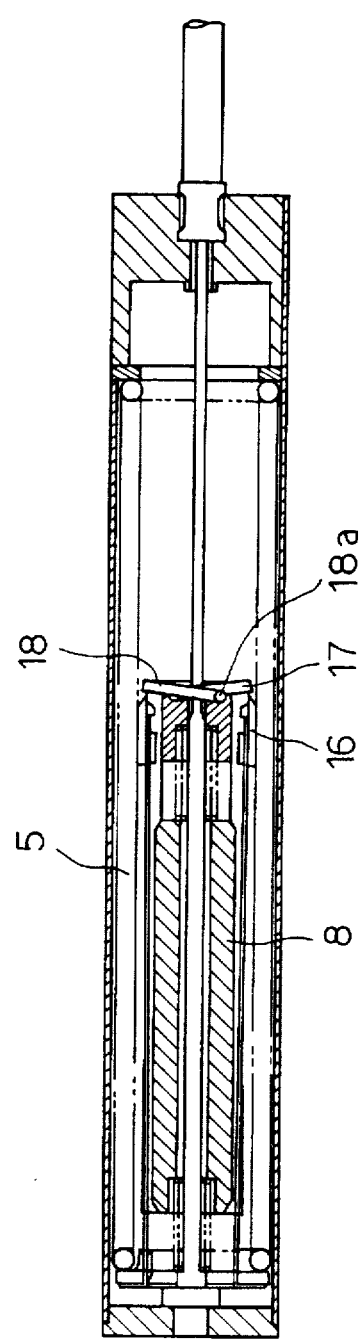
FIG.10
FIG.11

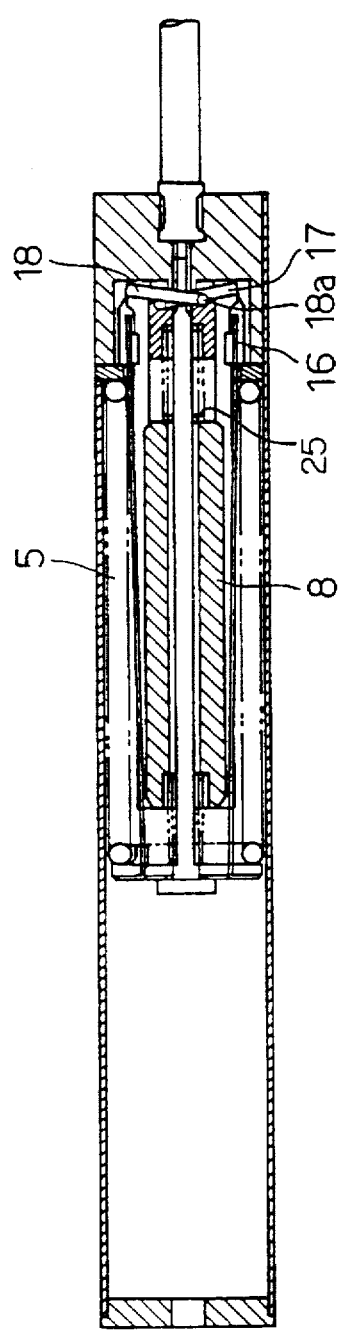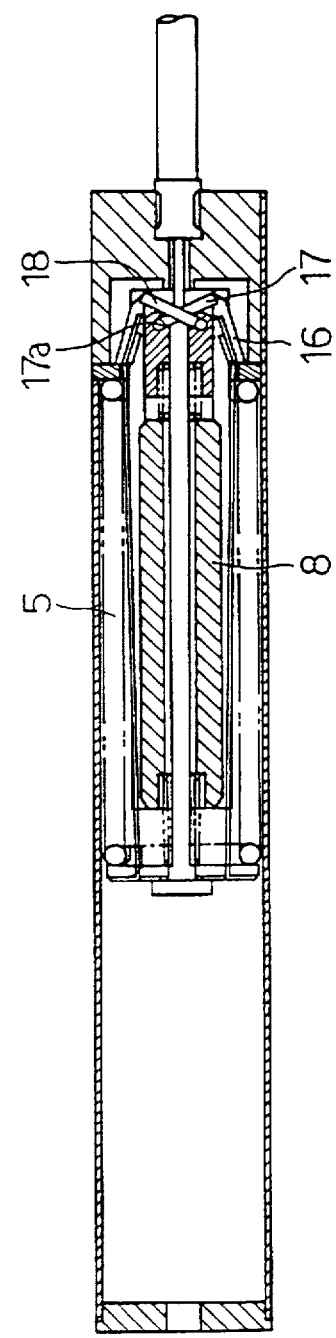

SEAT BELT TENSIONER

CROSS REFERENCE TO RELATED APPLICATIONS

This application is based upon and claims priority from Japanese Patent Application No. Hei 6-118959 filed May 31, 1994 and Japanese Patent Application No. Hei 6-142299 filed May 31, 1994, the contents of which is incorporated herein by reference.

BACKGROUND OF THE INVENTION

1. Field of the Invention

The present invention relates to a tensioner designed to cause tension of a seat belt upon sudden deceleration of a vehicle and more particularly, to a compact seat belt tensioner which securely retracts and tightens a seat belt.

2. Description of the Related Art

A seat belt tensioner is designed to rapidly retract a seat belt and thus, avoid loosening of the seat belt. The seat belt tensioner is used with locking of a retractor so as to protect an occupant. Recently, there is a need for a small seat belt tensioner. To this end, there has been proposed a seat belt tensioner wherein a seat belt buckle and other members are pulled under the action of a coil spring.

For example, Japanese Patent Application Laid-Open No. Hei 5-193443 (first publication), Japanese Patent Application Laid-Open No. Hei 4-317839 (second publication), Japanese Patent Application Laid-Open No. Hei 4-63746 (third publication), and Japanese Utility Model Application Laid-Open No. 5-42013 (fourth publication) are disclosed.

A typical seat belt tensioner has a draw-in section in which a coil spring is disposed, and a reverse prevention section designed to prevent a seat belt buckle from being pulled out as an occupant is moved.

The first and second publications disclose a reverse prevention section which includes claws engageable with each other to prevent a seat belt buckle from being pulled out. However, there is no suggestion that the seat belt buckle can be pulled out to reuse a draw-in section after it is retracted once. The third publication discloses a draw coil spring in a compressed state and a trigger mechanism arranged within a cylindrical casing. When an inertial force is applied to the coil spring as a mass body as a result of deceleration, the trigger mechanism is rendered operative to extend the coil spring so as to rapidly pull a seat belt buckle.

In such a conventional seat belt tensioner, the coil spring serves as a mass body. This complicates the trigger mechanism and the like to some extent. Another disadvantage is that the compressed coil spring tends to be deformed sidewardly to contact with the inner wall of the casing and may not be rendered operative, due to friction, to tighten the seat belt upon application of a predetermined inertial force.

The fourth publication discloses a reset mechanism to reuse a seat belt tensioner. However, this mechanism is located adjacent to a seat back and remote from a coil spring and is relatively complicated. The reset mechanism is operable with forward inclination of the seat back.

Such an arrangement occupies a substantial floor space and is cumbersome since the seat back must be inclined whenever the tensioner is reset.

SUMMARY OF THE INVENTION

It is an object of the present invention to overcome these problems and to provide a seat belt tensioner which is compact and properly functions whenever deceleration occurs.

It is another object of the present invention to provide a seat belt tensioner which is simple and compact as a whole, and which can be reset.

To achieve the objects, one preferred mode of a seat belt tensioner of the present invention is a seat belt tensioner to tense a seat belt when a predetermined deceleration force of a vehicle is exerted, includes: a resilient member for providing a retracting force for retracting a seat belt buckle; a casing accommodating the resilient member; a retaining member retaining the resilient member; a restriction member holding the retaining member in a predetermined position; a connecting member connected to the retaining member and accommodated within the resilient member, said connecting member transmitting the retracting force of the resilient member to the seat belt buckle; and a mass body arranged within the resilient member and releasing the restriction member from the predetermined position by moving with inertia force when the predetermined deceleration is applied so that the resilient member is released.

In other preferred mode of the present invention, a seat belt tensioner further includes the retaining member having a first portion and second portion both which retain the resilient member between them, the second portion is fixed to the casing and the first portion is movable with the resilient member so that the first portion is forced by the retracting force when the restriction member is released.

BRIEF DESCRIPTION OF THE DRAWINGS

FIG. 10 is a cross sectional view of the draw-in section when the cams 17 and 18 begin to be slanted by the move of the mass body 8;

FIG. 11 is a cross sectional view of the draw-in section after it has been operated;

FIG. 12 is a cross sectional view of the draw-in section when a seat belt buckle is pulled back; and FIG. 13 is a sectional view of the draw-in section when a seat belt buckle is pulled back.

DETAILED DESCRIPTION OF THE PREFERRED EMBODIMENTS

[Embodiment 1]

Figure 1:
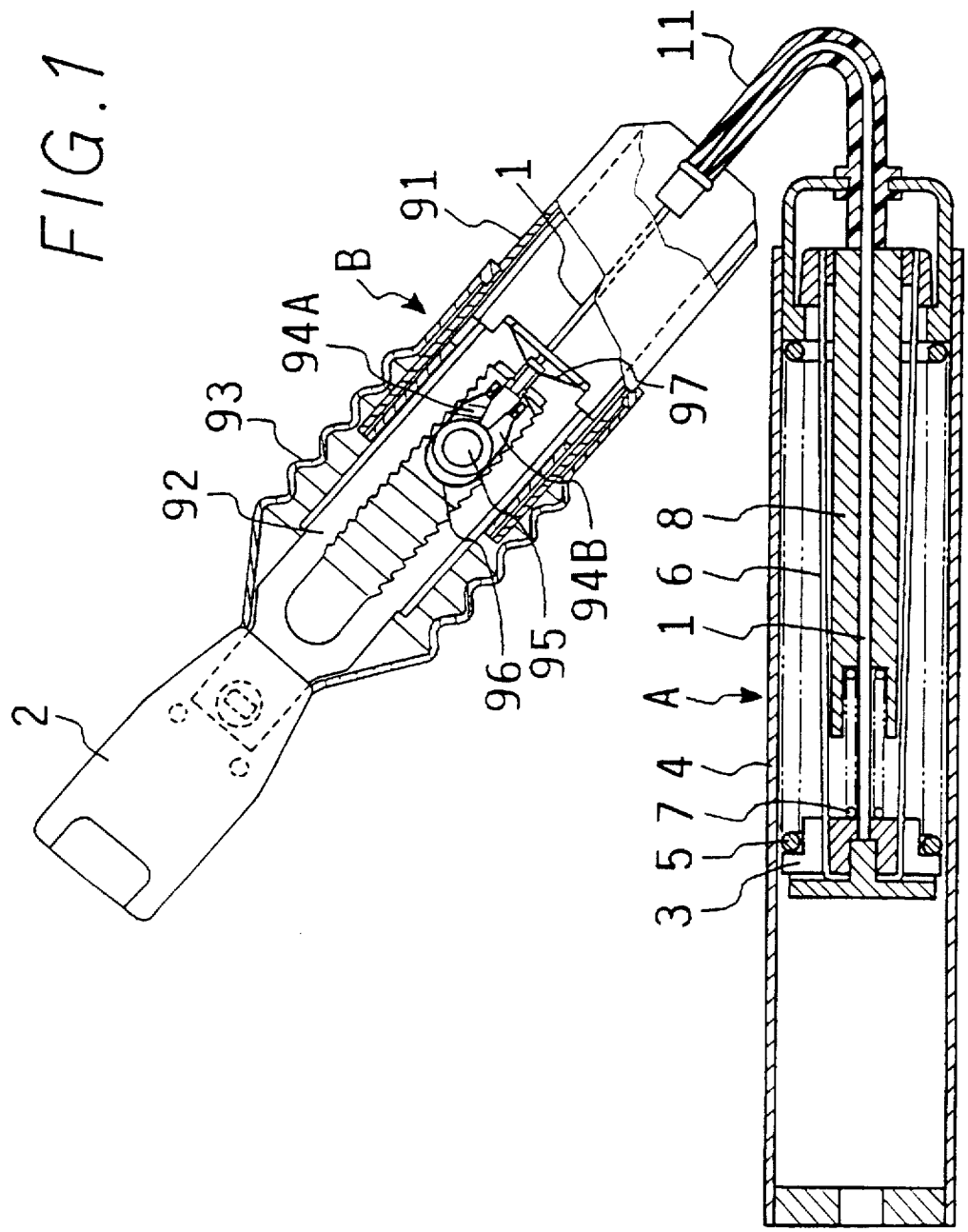
FIG. 1 is a cross sectional view of a seat belt tensioner according to first embodiment of the present invention.

Referring to FIG. 1, a seat belt tensioner includes a draw-in section A, and a reverse prevention section B adapted to support a seat belt buckle 2 and prevent pulling of the seat belt buckle after it has been pulled once. Although not shown, these sections are secured to one side a seat. The sections A and B are interconnected by a wire 1 as a connecting member which extends through a flexible tubing 11.

Figure 2:
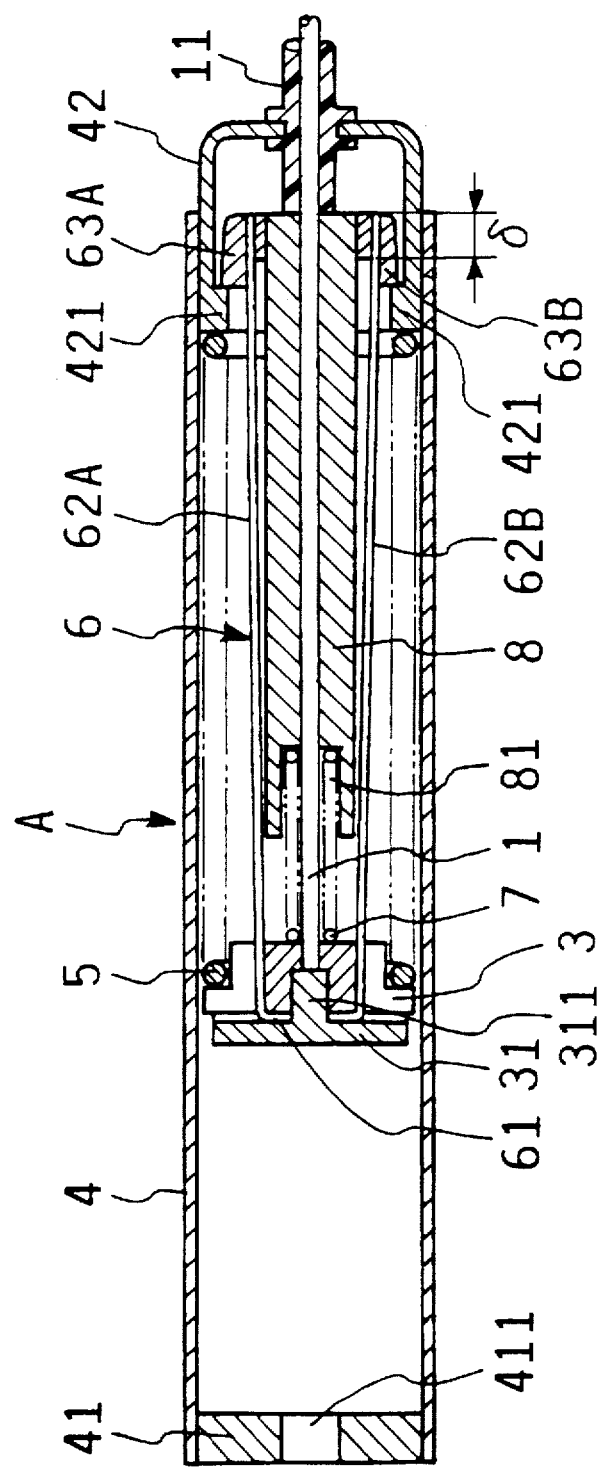
FIG. 2 is a cross sectional view of a draw-in section.

FIG. 2 shows the draw-in section A in detail. As shown, the draw-in section A includes a casing 4 which is cylindrical in shape and is horizontally oriented in the longitudinal direction of a vehicle (The left side in the figure is forward). The casing 4 has a front end closed by an end cap 41 which includes an opening 411. Housing member 42 is fit into the rear end of the casing 4.

Disposed within the casing 4 is a thick circular spring retainer 3 (FIG. 3) which is free to move in a horizontal direction and has a reduced diameter portion. A primary coil spring 5 is disposed between the rear side of the reduced diameter portion and the open inner edge of the housing member 42 and extends along the inner peripheral wall of the casing 4. The primary coil spring 5 provides a strong spring force and is held in a compressed state by means as will be described below.

A circular retainer plate 31 (FIG. 3) extends along the front surface of the spring retainer 3 and has a central projection 311. The projection 311 extends from the rear surface of the retainer plate 31 into the central bore of the spring retainer 3. A leaf spring 6 has a flange plate 61 at its proximal end and serves as a part of a restriction member. The flange plate 61 is sandwiched between the retainer plate 31 and the spring retainer 3. The leaf spring 6 also has a pair of legs 62A and 62B which extend rearwardly from the upper and lower ends of the substantially circular flange plate 61 (FIG. 3), respectively. The spring retainer 3 has an upper recess 321 and a lower recess 322 through which the legs 62A and 62B extend. The legs 62A and 62B are spaced apart from each other and diverge in a rearward direction.

Stoppers 63A and 63B are secured to and extend through the free ends of the respective legs 62A and 62B of the leaf spring 6. The stoppers 63A and 63B are engaged with the rear surface of a stopper wall 421 which extends from the open edge toward the center of the housing member 42. (The leaf spring 6 having the legs 62A and 62B and the stoppers 63A and 63B define a restriction member. The retainer 3, retainer plate 31, central projection 311, housing member 42, and stopper wall 421 define a retaining member). This arrangement blocks forward movement of the spring retainer 3 and thus, holds the primary coil spring 5 in a compressed state between the spring retainer 3 and the fixed housing member 42. The stopper wall 421 has an inner diameter substantially equal to the inner diameter of the primary coil spring 5.

Figure 3:
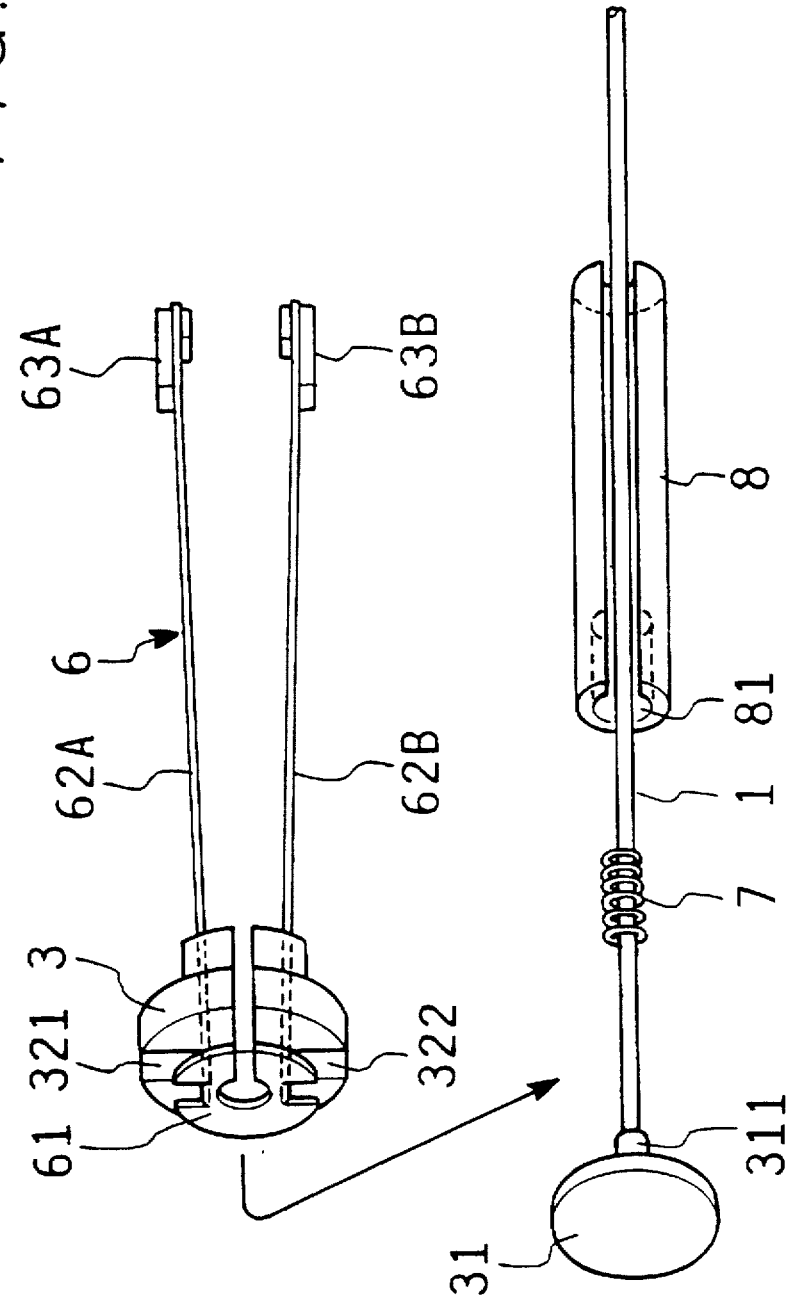
FIG. 3 is an exploded perspective view showing the principal part of the draw-in section.

A mass body 8 is disposed between the upper and lower legs 62A and 62B of the leaf spring 6 and is cylindrical in shape (FIG. 3). A central recess 81 is formed in the front end of the mass body 8. A secondary coil spring 7 is disposed between the bottom of the recess 81 and the rear surface of the spring retainer 3 and provides a weak spring force to urge the mass body 8 into engagement with one end of the flexible tubing 11 which is inserted into the housing member 42. The rear end of the mass body 8 is also brought into contact with the stoppers 63A and 63B of the legs 62A and 62B so as to prevent disengagement of the stoppers 63A and 63B from the stopper wall 421.

The wire 1 has one end secured to the projection 311 of the retainer plate 31. The wire 1 extends through the central bore of the spring retainer 3, the secondary coil spring 7, and the central through bore of the mass body 8 and is connected through the flexible tubing 11 to the reverse prevention section B as will be explained below. As shown in FIG. 3, the wire 1 is inserted into the central bores of the retainer plate 31, the flange plate 61, the spring retainer 3 and the mass body 8 from their respective side recesses.

Figure 4:
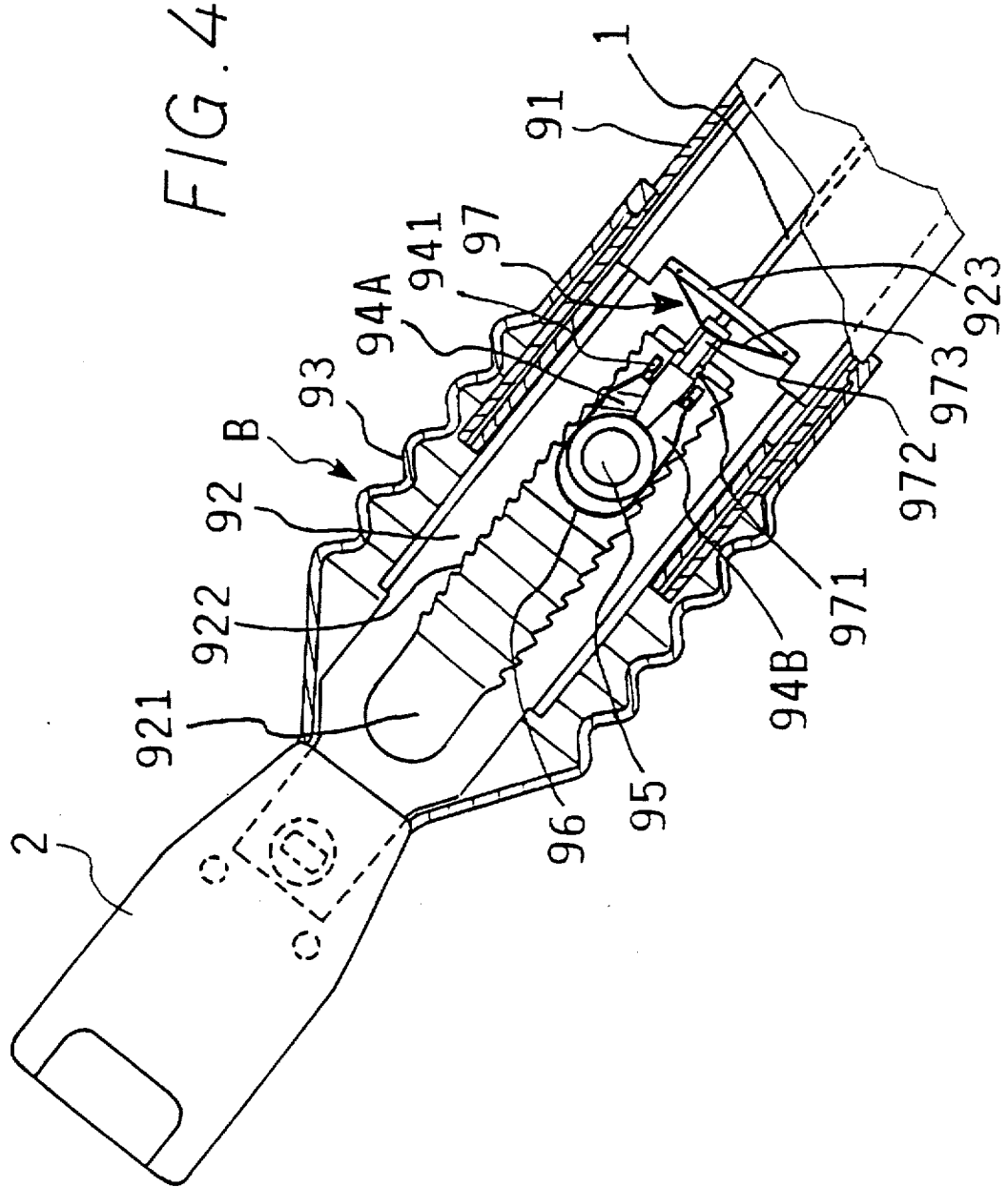
FIG. 4 is a partially sectional and partly cut away view of a reverse prevention section.

Referring to FIG. 4, the reverse prevention section B includes a fixed cover 91. The fixed cover 91 has a flat rectangular prismatic configuration. A reverse prevention hook plate 92 extends from the seat belt buckle 2 into the fixed cover 91 and is slidably movable within the fixed cover. An elongated opening 921 is formed in the central part of and extends longitudinally of the reverse prevention hook plate 92. The reverse prevention hook plate 92 also has opposite sides which face with and extend parallel to the elongated opening 921. A plurality of hooks 922 are formed in these opposite sides of the reverse prevention hook plate 92.

The entire reverse prevention hook plate 92, rather than the seat belt buckle 2, is provided within a movable cover 93. The movable cover 93 has a flat rectangular prismatic configuration and is in the form of an expandable bellows. The movable cover 93 has an open top secured to the seat belt buckle 2 and an open bottom engaged with the peripheral wall of the fixed cover 91.

A pair of right and left reverse prevention pawls 94A and 94B are provided within the elongated opening 921 of the reverse prevention hook plate 92. These reverse prevention pawls 94A and 94B are made from a press molded plate and is symmetrical. Each reverse prevention pawl includes a ring-shaped end or head, and a leg extending from the head. When the heads of the reverse prevention pawls are superimposed, the legs are flush with each other. A bolt 95 extends through the heads to secure the assembly to the seat. The heads are rotatable about the bolt 95.

An elongated opening 941 is formed in the end of the leg of each of the reverse prevention pawls 94A and 94B and extends along the inner edge of each leg. A leaf spring 96 is bent to have an inverted-U shape and has a distal end inserted into the elongated opening of each leg. By this arrangement, the legs of the right and left reverse prevention pawls 94A and 94B are urged away from each other. A plurality of hooks or pawls are formed in the outer surface of each leg and engaged with the hooks 922 of the reverse prevention hook plate 92 so as to prevent upward movement of the reverse prevention hook.

A leaf spring 97 has a rectangular head portion 971 inserted between the right and left reverse prevention pawls 94A and 94B so as to prevent inward movement of the reverse prevention pawls 94A and 94B. As such, the reverse prevention pawls 94A and 94B will in no way be separated from the hooks 922 of the reverse prevention hook plate 92. Neither upward movement, nor downward movement of the reverse prevention hook plate 92 (thus, the seat belt buckle 2) can take place.

The leaf spring 97 includes a leg portion 973 which is connected to the head portion 971 through a connecting portion 972 and diverges from the connecting portion 972. The reverse prevention hook plate 92 has a bent lower end or stopper wall 923. The stopper wall 923 has mounting holes to receive the front ends of the leg portion 973. The wire 1 extends from the casing 4 and passes through the flexible tubing 11 (FIG. 11). The wire 1 has a block-like end secured to the connecting portion 972 of the leaf spring 97.

Figure 5:
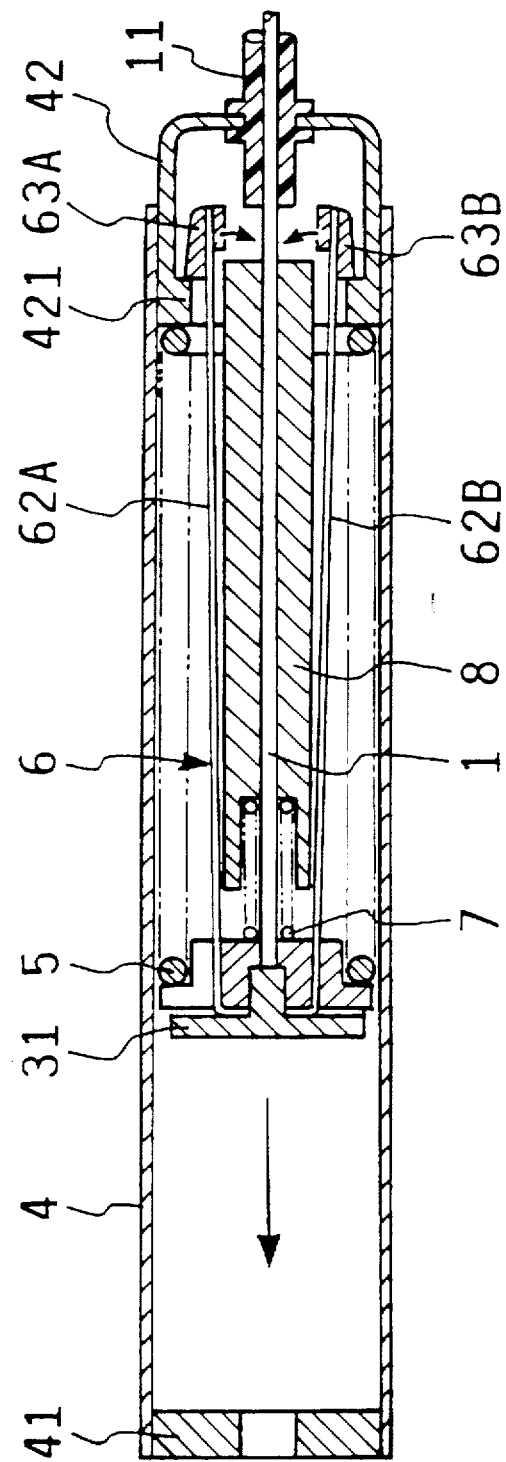
FIG. 5 is a cross sectional view of the draw-in section in use.

With the seat belt tensioner thus constructed, the mass body 8 is advanced while compressing the secondary coil spring 7, as shown in FIG. 5, when an inertial force is applied to the mass body 8 as a result of deceleration of a vehicle. This causes the inner surfaces of the stoppers 63A and 63B of the leaf spring 6 to be separated from the outer periphery of the mass body 8. The stoppers 63A and 63B are subject to moment in the direction of the arrow in FIG. 5 under the influence of the primary coil spring 5. As a result, the free end of the leaf spring is inwardly inclined to cause disengagement of the end surfaces of the stoppers 63A and 63B from the stopper wall 421. The primary coil spring 5 is then extended under substantial spring force to rapidly move the spring retainer 3 and the retainer plate 31 forwards. Thus, the wire 1 is pulled or moved forwards under substantial force.

As this occurs, the wire 1 is moved down in the reverse prevention section B (FIG. 4). The block-like end of the wire 1 is then brought into contact with the stopper wall 923. At the same time, the leg portion 973 of the leaf spring 97 is deformed or moved down to cause the head portion 971 to escape from the right and left reverse prevention pawls 94A and 94B. This allows inward movement of the right and left reverse prevention pawls 94A and 94B.

As the reverse prevention hook plate 92 is moved down by the wire 1, the reverse prevention pawls 94A and 94B are inwardly displaced to move over the hooks 922. The reverse prevention hook plate 92 is then rapidly moved down to pull the seat belt buckle 2.

After the seat belt buckle 2 is fully pulled, loads are applied to the reverse prevention hook plate 92 through the seat belt buckle 2 to pull up the reverse prevention hook plate 92 when the occupant is moved forwards. However, the reverse prevention hook plate 92 will in no way be moved up since the reverse prevention pawls 94A and 94B are engaged with the hooks.

In order to reset the take-up section A, the ends of the opposite leg portions of the leaf spring 96 in the reverse prevention section B are gripped by a tool. This causes inward movement of the leg portions against the action of the leaf spring. As a result, the right and left reverse prevention pawls 94A and 94B are inwardly moved so as not to interfere with the hooks 922 of the reverse prevention hook plate 92. Then, the seat belt buckle 2 and the reverse prevention hook plate 92 are moved up to cause corresponding movement of the wire 1. At this time, the wire 1 is moved rearward in the draw-in section A (FIG. 2).

As the wire 1 is moved rearward, the retainer plate 31 and the spring retainer 3 are moved back to their initial positions while compressing the primary coil spring 5. At this time, the stoppers 63A and 63B are moved on and along the inner periphery of the primary coil spring 5 and pass over the stopper wall 421. The stoppers 63A and 63B are then located behind and engaged with the stopper wall 421. Thereafter, the outer periphery of the mass body 8 is moved between the stoppers 63A and 63B to prevent disengagement of the stoppers from the stopper wall 421.

In this embodiment, it is possible to accurately provide even a relatively small degree of inertial force to initiate movement of the mass body 8 by appropriately determining the spring force of the coil spring 7. Thus, the seat belt can securely be pulled not only when a vehicle is suddenly decelerated, but also when the vehicle runs on a stepped or rough road.

Also, it is possible to determine appropriate time during which an inertial force resulting from deceleration is maintained to pull the seat belt by adjusting the amount δ of which the stoppers 63A and 63B are overlapped with the outer periphery of the mass body 8.

[Embodiment 2]

Figure 6:
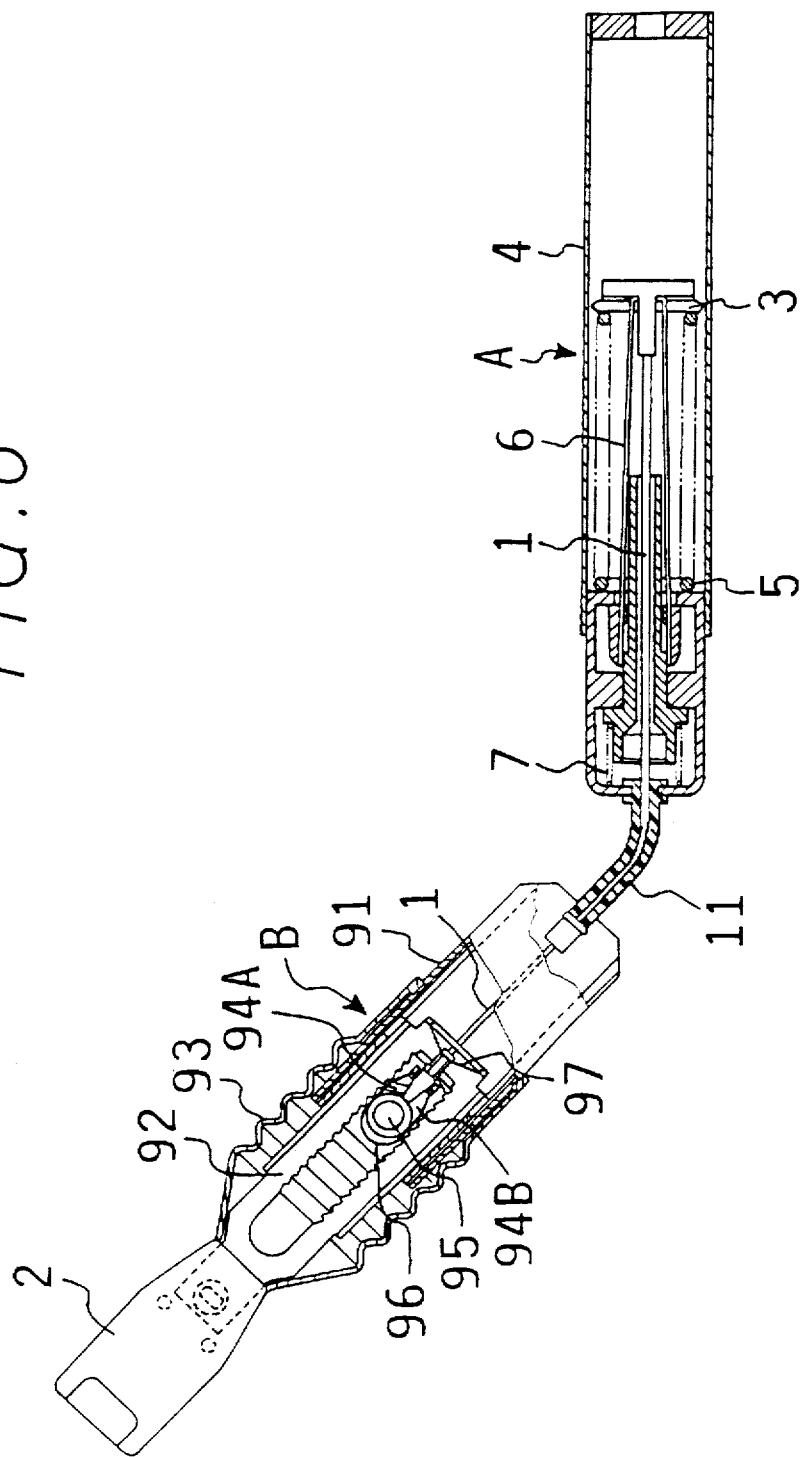
FIG. 6 is a cross sectional view of a seat belt tensioner according to second embodiment of the present invention.

Referring to FIG. 6, a reverse prevention section B is located forwardly of (or at the left side of) a draw-in section A rather than rearwardly of the draw-in section A as in the first embodiment. A flexible tubing 11 is gradually bent between these two sections. The wire 1 passes through the flexible tubing 11 and provides a connection between the sections A and B. The reverse prevention section B is identical in structure to that of the first embodiment. Reference will now be made only to the structure of the draw-in section A.

Figure 7:
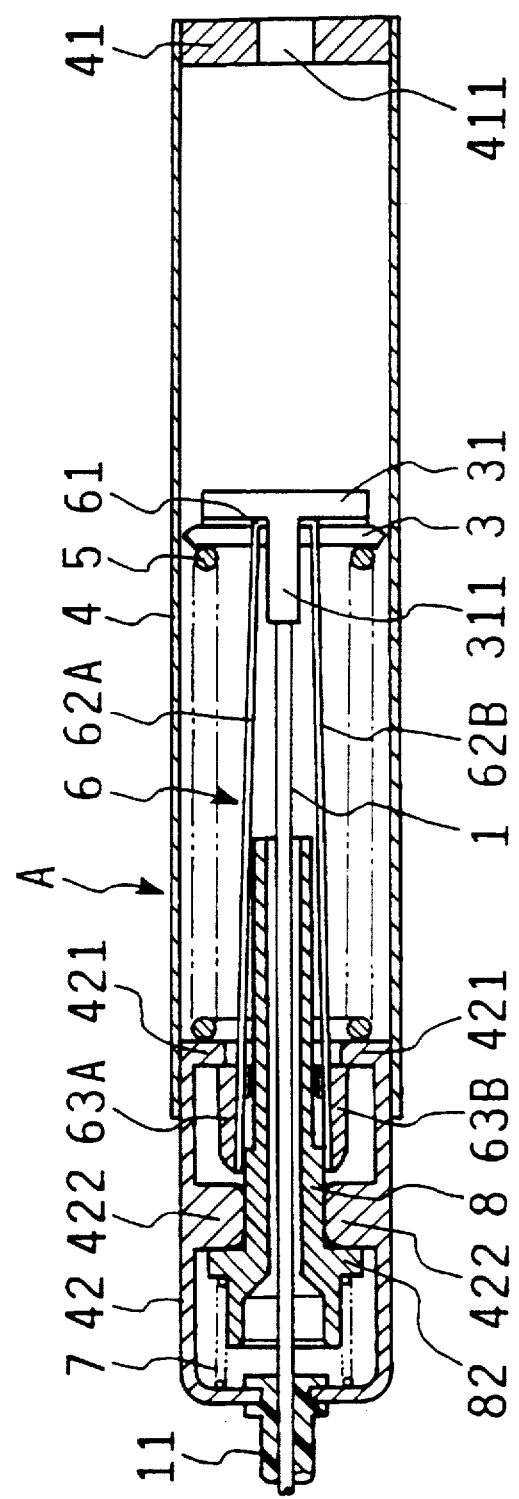
FIG. 7 is a cross sectional view of a draw-in section.

Referring to FIG. 7, a cylindrical casing 4 extends in a horizontal direction and has a front end closed by a housing member 42. The rear end of the casing 4 is closed by an end cap 41. A guide wall 422 extends from the inner peripheral surface of the housing member 42 intermediate its length. A mass body 8 is horizontally supported by the guide wall 422 and is free to slide.

The mass body 8 is cylindrical, but has a step to provide different diameters. A flange 82 is formed on the proximal end of the mass body 8 and is in contact with the guide wall 422. The mass body 8 has a stepped or reduced diameter distal end which extends into the casing 4. A weak secondary coil spring 7 is disposed between the flange 82 of the mass body 8 and the bottom of the housing member 42. Thus, the mass body 8 is held in position, as shown, with the flange 82 being urged against the guide wall 422.

A circular spring retainer 3 is linearly moved within the casing 4. A strong primary coil spring 5 is disposed between the spring retainer 3 and a stopper wall 421. The stopper wall 421 extends from the open end of the housing member 42. A leaf spring 6 has a flange plate 61 at its proximal end. The flange plate 61 is in contact with the rear surface of the spring retainer 3. The leaf spring 6 also has an upper leg 62A and a lower leg 62B. The upper and lower legs 62A and 62B extend forwardly from the flange plate 61 and pass through the stopper wall 421. Stoppers 63A and 63B are secured to the front ends of the upper and lower legs 62A and 62B, respectively and engaged with the front surface of the stopper wall 421. This arrangement limits rearward movement of the spring retainer 3 and holds the primary coil spring 5 in a compressed state regardless of its spring force. Each of the legs 62A and 62B of the leaf spring 6 has a front end contacted with the outer periphery of the mass body 8 intermediate its length. This arrangement prevents inward movement of the legs 62A and 62B and thus, separation of the stoppers 63A and 63B from the stopper wall 421.

A retainer plate 31 has a central projection 311 on its front surface. The wire 1 extends through the central bore of the mass body 8 and has one end connected to the projection 311.

With such an arrangement, the mass body 8 is advanced while compressing or deforming the secondary coil spring 7 if an inertial force is applied to the mass body 8 as a result of sudden deceleration of the vehicle. The front ends of the legs 62A and 62B of the leaf spring are then separated from the outer periphery of the mass body 8 to cause disengagement of the stoppers 63A and 63B from the stopper wall 421. As a result, the spring retainer 3 is free to move, and the primary coil spring 5 is extended to provide a strong spring force to rapidly move the spring retainer 3 rearward. The retainer plate 31 is moved with the spring retainer 3 so as to pull the wire 1 rearward. This results in retraction of the seat belt buckle 2 (FIG. 6).

In order to reset the draw-in section A, the seat belt buckle 2 is pulled up to advance the wire 2. The spring retainer 3 is then returned to near its original position while the primary coil spring 5 is being compressed. The front ends of the legs 62A and 62B are brought into contact with the intermediate step of the mass body 8 so as to advance the mass body 8 against the action of the secondary coil spring 7. Further pulling of the wire 1 causes the stoppers 63A and 63B to be moved behind and engaged with the stopper wall 421. At the same time, the front ends of the legs 62A and 62B of the leaf spring are moved outward and again brought into engagement with the outer periphery of the mass body 8 intermediate its length as the mass body 8 is urged by the secondary coil spring 7. The draw-in section A is thus returned to the state before it was operated.

This embodiment offers the same advantages as the first embodiment does. It is also possible to reduce transmission loss when the seat belt buckle is pulled since the wire between the draw-in section and the reverse prevention section can be gradually bent as it is secured to the seat.

It is clear from the foregoing description that the present invention provides a seat belt tensioner which is simple and compact in structure and which is safely operated to tighten the seat belt when a vehicle is suddenly decelerated and thus, protects an occupant.

[Embodiment 3]

Figure 8:
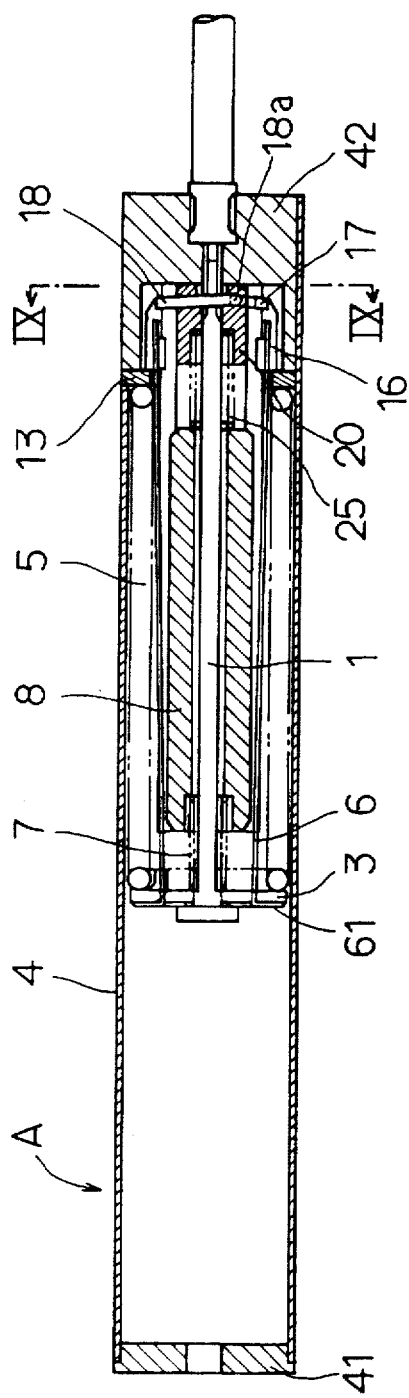
FIG. 8 is a cross sectional view of the draw-in section according to third embodiment of the present invention.
Figure 9:
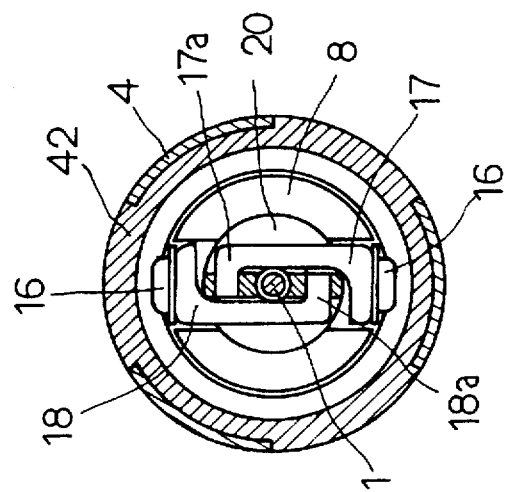
FIG. 9 is a cross sectional view of the draw-in section taken along the line IX—IX in FIG. 8.

FIG. 8 is a cross sectional view of the draw-in section A. FIG. 9 is a sectional view taken along the line IX—IX in FIG. 8.

A primary coil spring 5 is axially compressible within a cylindrical casing 4. The coil spring 5 has one end supported by a plate 13 which is protruded inward and fixed to the casing 4. The other end of the coil spring 5 is in contact with a retainer 3. A leaf spring 6 has a flange plate 61 which is in contact with one end of the retainer 3. Two leaf spring portions extend axially through the retainer 3, diverge gradually in a rightward direction in FIG. 8, and then, extend through the plate 13. A protrusive trigger 16 is crimped to the leading end of each of the two leaf spring portions. The trigger 16 has a shoulder engaged with the end surface of the plate 13. Two C-shaped levers 17 and 18 have leading ends contacted with the leading end of the trigger 16. The shoulder of the trigger 16 is engaged with the end surface of the plate 13 so as to limit axial movement of the leaf spring 6 and hold the coil spring 5 in a compressed state, as shown in FIG. 8. At this time, the leaf spring 6 tends to be radially inwardly deflected under the action of the coil spring 5. However, the leaf spring 6 will in no way be deflected and can be held in position as its leading end is supported by the levers 17 and 18 defining a restriction member.

A substantially cylindrical mass body 8 extends axially within and adjacent to the inner periphery of the leaf spring 6 and has an outer periphery near the inner periphery of the coil spring 5. The mass body 8 has two grooves along which the two leaf spring portions of the leaf spring extend. A cylindrical space is axially defined adjacent to the center axis of the mass body 8 and inwardly of the trigger 16. A piston 20 is disposed in this space and is free to reciprocate in the axial direction. A light compression spring 25 is disposed between the piston 20 and the mass body 8 so as to urge the piston 20 to the right in FIG. 8. A compression sensing spring 7 is disposed between the left end of the mass body 8 and the retainer 3 so as to apply a predetermined axial force to the mass body 8 which is axially movable within the casing.

The wire 1 extends centrally through the piston 20. The piston 20 has horizontal bores to receive pivots 17a and 18a of the levers 17 and 18. The pivots 17a and 18a are offset upwardly and downwardly from the center axis of the piston 20. The levers 17 and 18 are free to swing about these bores.

The wire 1 extends through the retainer 3 and has a front end which is enlarged to provide a flange portion. This flange portion is in contact with the flange plate 61 of the leaf spring 6. The wire 1 extends through the mass body 8 and out of the casing and terminates at the reverse prevention hook plate 92. A cap 41 is fixed to one end of the casing 4 and has a hole. The other end of the casing 4 is closed by a housing member 42. The housing member 42 has a central hole through which the wire 1 can pass. The tubing 11 has one end secured to the housing member 42.

Reference will next be made to the operation of the draw-in section.

FIG. 8 shows the initial state of the draw-in section A wherein the coil spring 5 is held in a compressed condition. If an inertial force is applied to the mass body 8 as a result of sudden deceleration of the vehicle, then the mass body 8 is moved to the left in FIG. 8 against the action of the sensing spring 7. There is a corresponding movement of the piston 20 and the pivots 17a and 18a of the levers 17 and 18. The leaf spring 6 produces a force to move the levers 17 and 18 radially inwardly through the trigger 16. As such, if the inertial force becomes greater than a predetermined level, and the pivots 17a and 18a of rotation of the levers are displaced to the left side of a vertical position, then the levers 17 and 18 are inclined to push the piston 20 further to the left (FIG. 10). This releases the trigger 16.

Then, the trigger 16 is radially inwardly moved to disengage from the coil spring 6. The coil spring 6 cooperates with the retainer 3 and the flange plate 61 to pull the wire 1 to the left end of the casing (FIG. 11). As a result, the seat belt buckle 2 connected to the other end of the wire 1 is rapidly retracted to tighten the seat belt.

Reference will now be made to the manner in which the draw-in section can be reset to its initial state.

First, the reverse prevention pawls 94A and 94B are inwardly moved to cause the hook or projection to be disengaged from the hooks of the reverse prevention hook plate 92.

Then, the seat belt buckle 2 and the reverse prevention hook plate 92 are moved up to pull the wire 1 from the draw-in section A.

As the wire 1 is pulled, the coil spring 6 is compressed while the mass body 8, the piston 20 and other members are moved to the right as shown. This causes the piston 20 and the right end of the trigger to come into contact with the end of the housing member 42 and the levers 17 and 18, respectively (FIG. 12). As the wire 1 is further pulled, the trigger 16 pushes the levers 17 and 18 to the right. The levers 17 and 18 are then rotated about the corners of an end surface 24A of the housing member 42 to push the piston 20 and thus, allow rightward movement of the trigger 16. The trigger 16 is then moved to the right side of the plate 13 and also, radially outwardly spread for engagement (FIG. 13). Then, the piston 20 is pushed back under the action of the weak spring 25. This causes the levers 17 and 18 to rotate and move below the lower surface of the trigger 16. The draw-in unit is thus returned to its initial state as shown in FIG. 8. As stated earlier, this embodiment provides a compact arrangement by incorporating the components within the outer diameter of the leaf spring 6. The levers 17 and 18 are rotated to the restriction means. This arrangement reduces a coefficient of friction μ on contact of components, avoids errors in operation under the influence of an inertial force, and enables accurate operation. The levers 17 and 18 are arranged to straddle the center axes. This results in an increase in the lever ratio. Thus, the seat belt tensioner can be operated with a small mass and can be made compact. Also, the center of rotation of the lever is axially displaced to enable operation of the lever before the large mass 8 is moved. This enables reduction in the time until which the trigger is disengaged.

What is claimed is:

1. A seat belt tensioner to tense a seat belt when a predetermined deceleration force of a vehicle is exerted, comprising:

a resilient member for providing a retracting force for retracting a seat belt buckle;

a casing accommodating said resilient member;

a retaining structure retaining said resilient member;

a restriction structure holding said retaining structure in a predetermined disposition;

a connecting member connected to said retaining structure and accommodated within said resilient member, said connecting member transmitting said retracting force of said resilient member to said seat belt buckle; and a mass body arranged within said resilient member and releasing said restriction structure so as to release said retaining structure from said predetermined disposition by moving with inertia force when said predetermined deceleration is applied so that said resilient member is released.

2. The seat belt tensioner according to claim 1, wherein said retaining structure has a retainer and a fixed member both of which retain said resilient member there between, said fixed member being fixed to said casing and said retainer being movable with said resilient member so that said retainer is forced by said retracting force when said restriction structure is released.

3. A seat belt tensioner according to claim 1, wherein said connecting member is moved in a direction opposite to a direction in which said seat belt buckle is retracted, whereby said retaining structure is returned to said predetermined disposition to allow said resilient member to accumulate said retracting force.

4. A seat belt tensioner according to claim 1, wherein said mass body includes a through hole extending in the direction in which said mass body is moved, and said connecting member extends through said through hole and is connected to said seat belt buckle.

5. A seat belt tensioner according to claim 1, wherein a piston is operatively coupled to said mass body, and said piston has said restricting structure for holding said retaining structure in said predetermined disposition.

6. A seat belt tensioner according to claim 5, wherein said restriction structure includes a lever pivotally mounted to said piston.

7. A seat belt tensioner according to claim 1, wherein said seat belt buckle includes a reverse prevention section to selectively prevent said seat belt buckle from withdrawing in a retraction direction thereof.

8. A seat belt tensioner according to claim 7, wherein said reverse prevention section is accommodated in a housing, said housing being connected to said casing through a flexible tube through which said connecting member extends.

9. A seat belt tensioner according to claim 1, wherein said resilient member is a cylindrical compression coil spring.

10. A seat belt tensioner according to claim 9, wherein at least a substantial portion of said retaining structure is located within said compression spring and includes plates extending outwardly in a radial direction of said compression spring, and shoulder portions formed at tip ends of said plates, said restriction structure being disposed to oppose said shoulders.

11. A seat belt tensioner according to claim 10 wherein said restriction structure includes a part of said mass body.

12. A seat belt tensioner according to claim 10, wherein said retaining structure is moved within said compression spring when said compression spring is released.

13. A seat belt tensioner to tense a seat belt when a predetermined deceleration force of a vehicle is exerted, comprising:

a reverse prevention structure for supporting a seat belt buckle and preventing a seat belt from being withdrawn after said seat belt is drawn-in;

a draw-in structure for drawing in said seat belt including:

a first resilient member for providing a retracting force for retracting a seat belt buckle;

a casing accommodating said first resilient member;

a first retaining structure for retaining one end of said resilient member and being movable in said casing;

a second retaining structure for retaining an other end of said first resilient member and being fixed to said casing (4);

a restriction structure holding said first and second retaining structures and said first resilient member in a predetermined disposition;

a connecting member connected to said one of said first and second retaining structures at one end thereof and connected to said reverse prevention structure, said connecting member being accommodated within said resilient member;

a mass body having a through hole to receive said connecting member and being slidably disposed within said resilient member; and a second resilient member for forcing said mass body at one side of said casing so that when said predetermined deceleration is applied, said mass body slides and said restriction structure is released.

14. The seat belt tensioner according to claim 13, wherein said mass body has a portion pressing said restriction structure to said second retaining member.

* * * * *